Dec. 11, 1956  R. W. CHICK ET AL  2,773,731
AGING CONVEYOR
Filed Nov. 12, 1952
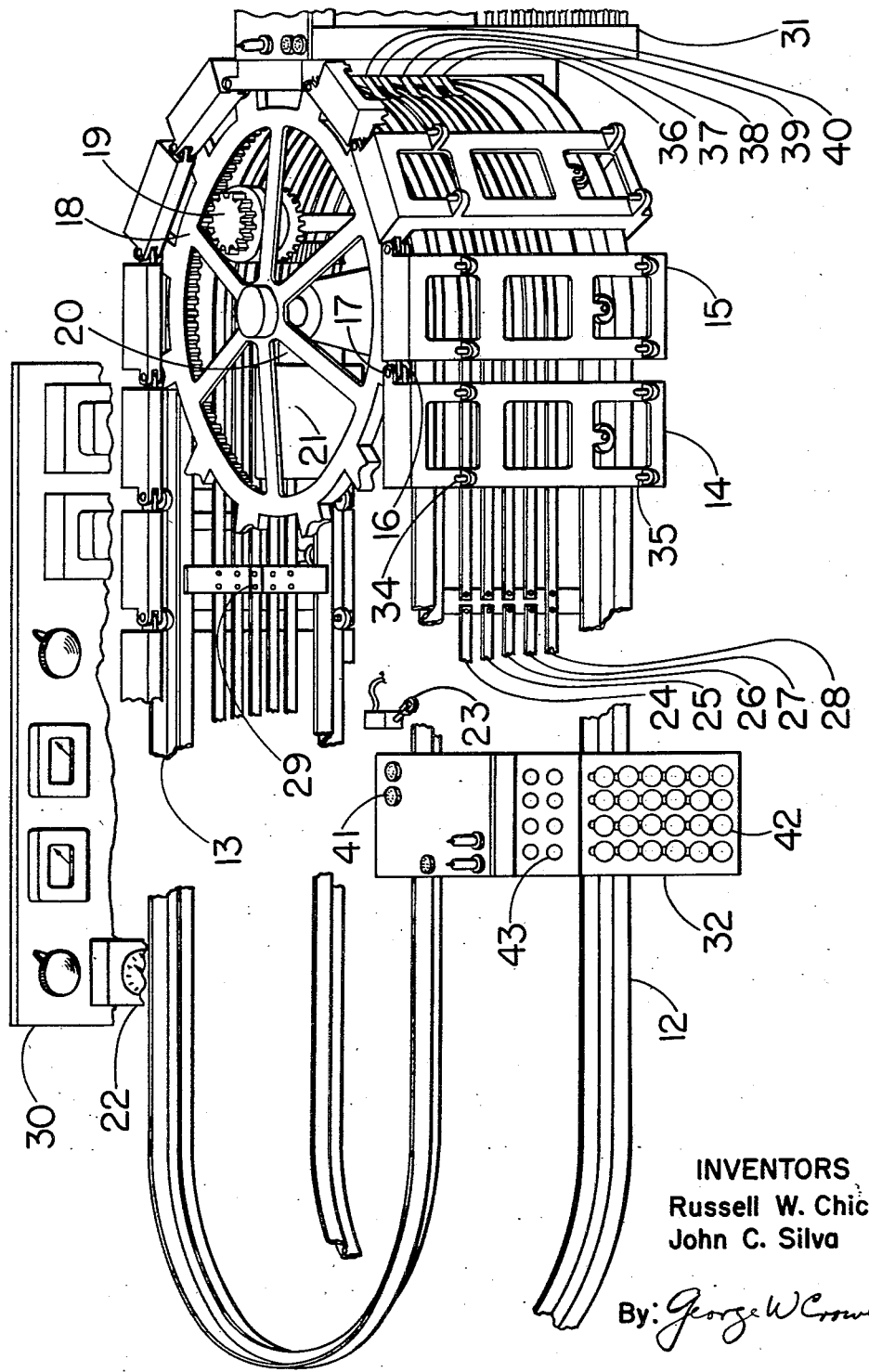
INVENTORS
Russell W. Chick
John C. Silva
By: *George W Crowley*
ATTORNEY

United States Patent Office 2,773,731
Patented Dec. 11, 1956

2,773,731

AGING CONVEYOR

Russell W. Chick, Beverly, and John C. Silva, Peabody, Mass., assignors to Columbia Broadcasting System, Inc., Danvers, Mass., a corporation of New York Application November 12, 1952, Serial No. 320,004

3 Claims. (Cl. 316—27)

This invention relates in general to the manufacture of electron tubes and in particular to apparatus for aging finished tubes.

A necessary step in the manufacture of electron tubes is the so-called aging process. In this process, finished tubes are operated under varying voltage-current conditions for certain periods of time, primarily to provide proper cathode activation and also to improve stability of operation in the finished product. The procedure involves the placing of various voltages on the elements of the tube in definite sequence as will be explained in greater detail hereinbelow.

This operation has been carried out in the past, for the most part, on stationary racks which consist, normally, of tables having a number of sockets into which tubes are plugged. Provision is made to place the desired voltages on the various elements of the tubes. There are also included incandescent lamps in several of the circuits for purposes of limiting currents through the tubes. Such lamps serve as regulators of the currents through the tubes, by reason of the fact that their resistance increases as their filaments become incandescent. Although aging racks of this kind are theoretically capable of performing the aging function adequately, in practice they are often unsatisfactory. Primarily, the failure of such racks is attributable to human error. Since adjustment of applied voltages and the timing of application is manually controlled, close adherence to a prescribed schedule is not usually achieved. Other objections to such aging racks include the additional tube handling required and the interruption of the continuous flow of tubes under process. Finally, the inflexibility of the racks, when it is desired to change to tube types having different aging requirements or even to make radical voltage changes in the aging schedule for a given type, is a highly undesirable feature.

Some efforts have been made to break the bottle-neck caused by aging. One of these systems included a rotary table carrying several sets of sockets for aging tubes and another included a conveyor belt on which numerous sets of sockets were mounted. However, these expedients also failed to satisfy all of the requirements for proper aging procedure. The primary disadvantage of the systems was their inflexibility in that only with the greatest difficulty could radical changes in the aging schedule of either voltage or time be made.

Hence, it is an object of the present invention to provide an aging conveyor which is integrated into the tube assembly line to take the full output of an exhaust machine with a minimum of tube handling.

It is a further object to provide an aging device which is quickly adaptable to different aging schedules and different tube types.

It is a still further object to provide an easily maintained semi-automatic conveyor having easily replacable units for accommodating large quantities of tubes.

In general, the present invention consists in an endless linked structure which is indexed about a generally elliptical path. Removable chassis carrying tube sockets and ballast lamps are detachably fixed to the linked elements. Adjustable power supplies, centrally located within the structure, provide a wide range of voltages which may be controlled from an easily accessible panel. These voltages are fed to bus lines arranyed about the structure and from which the chassis derive necessary voltages for the various tube elements. The bus lines are in the form of sectioned commutators, each section extending a distance along the structure somewhat smaller than the width of one of the removable chassis. A timer is provided to permit adjustment of the dwell time of the conveyor. Provision is also made for disconnecting the voltages applied to the bus lines during indexing movements. For a better understanding of the invention, together with other and further objects, advantages and features, reference should be made to the following description which is to be read in connection with the accompanying drawing, the single figure of which is a perspective view of a preferred embodiment of the aging conveyor.

Referring now to the drawing, there is shown a framework 12 which is generally elliptical in shape. A first track 13 made of angle iron is supported by framework 12. A series of carrier units, of which carriers 14 and 15 are typical, are supported partially by means of rollers on track 13 and are flexibly interconnected through the axles of the rollers. In this instance, carriers 14 and 15 are inter-connected through axle 17 of roller 16 which is similar to the other carrier connecting devices. At one end of framework 12, and enclosed therein, is a drive wheel 18 having internal teeth and U-shaped radial extensions for engaging the rollers. These teeth mesh with those of an output gear 19 of a speed reducing mechanism 20 which is driven by a motor 21. Connected to motor 21 and controlling the application of power thereto is a timer 22. Timer 22 is adjustable to determine the length of the off, or dwell, periods of the conveyor since it actuates motor 21 at the end of each dwell period. A limit switch 23, engagable by the rollers on track 13 between the carriers, determines the extent of travel during a given indexing motion of the carriers. When limit switch 23 is actuated by one of the carrier rollers, it disconnects power from the motor and re-sets timer 22.

Running about frame work 12, in roughly parallel relationship with track 13, are bus strips 24, 25, 26, 27 and 28. These strips, with the exception of strip 28 which is continuous about the periphery of framework 12, are segmented into a number of lengths equalling the number of carrier units mounted on framework 12. Each segment of a strip corresponds to, and will be referred to, as an indexing position. Jumper strips of the type shown at 29 are provided for inter-connecting any desired number of indexing positions. Voltage sources, of any reasonable number and output, are located centrally of framework 12 and are passed through a control panel 30 to the appropriate bus strip segments, the return lead for all supplies passing through continuous strip 28. In the present case, power supplies are provided for heater voltages, control grid voltages, plate voltages and voltages for application between heaters and cathodes. Appropriate means for adjusting these voltages are located on control panel 30. Timer 22 is connected in circuit with the return power lead from strip 28 to break the power circuit of all supplies during movement of the carriers.

Chassis 31 and 32 are identical in all respects to the other chassis of the aging apparatus. Each is generally L-shaped, the L being inverted when the chassis is attached to its carrier unit. The attachment is made by pairs of openings in the chassis cross-members, these openings engaging hook pairs as at 34 and 35 of carrier 14. Resilient brushes 36, 37, 38, 39, and 40 which may be made of phosphor bronze or other suitable springy conducting material, extend inwardly toward framework 12 from chassis 31, contacting strips 24, 25, 26, 27, and 28 respectively. On the upwardly facing surface of the chassis as at chassis 32, are a plurality of tube sockets 41 and on the outwardly facing surface of chassis 32 are a first plurality of lamp sockets 42 and a second plurality of lamp sockets 43. Sockets 42 are adapted to receive lamps of one type and sockets 43 lamps of a second type. Brush 40 which contacts continuous strip 28 serves as a return lead for all voltages and is the lead which is connected to the cathodes of the tubes plugged in sockets 41. Brush 39, contacting strip 27, is connected to one side of all lamp sockets 42, the other side of lamp sockets 42 being connected to all pin contacts of sockets 41 which receive plate leads of tubes inserted in those sockets. Brush 38, contacting strip 26 is connected to one side of all lamp sockets 43, the other side of lamp sockets 43 being connected to all the pin contacts of sockets 41 which receive the grid return leads of tubes inserted in those sockets. Brushes 37 and 36 contacting strips 27 and 28 lead directly to the pin contacts of sockets 41 which receive the heater leads of tubes inserted therein.

In operation, several of the positions in the aging conveyor are reserved for loading and unloading of tubes in sockets 41. In the loading positions, heater voltages only are applied to the tubes. In those and succeeding positions, a representative simple schedule of voltages might be as below, timer 22 providing a 1-minute dwell period in each position and each index of the conveyor carrying a given chassis one position further. The incandescent lamps used in the grid and anode circuits in this example would all be conventional 15 watt lamps, and, in addition, conventional 25 watt lamps would be placed in series between one side of the filaments and the cathodes.

| Pos. No. | $E_h$ | $E_{bk}$ | $E_g$ | $E_p$ |
| --- | --- | --- | --- | --- |
|  | v. A. C. | v. A. C. | v. D. C. | v. D. C. |
| 1–4 | 6.3 | 120 |  |  |
| 5–6 | 12 |  |  |  |
| 7–9 | 12 |  | 120 | 120 |
| 10–13 | 10 | 120 | 120 | 120 |
| 14 | 10 |  |  |  |
| 15–22 | 8 | 120 | 120 | 120 |
| 23–29 | Preheat at Proper Operating Potentials | | | |
| 30 | Unload For Test | | | |
| 31 | Load | | | |
| 32–48 | Alternate Load and Unload Positions | | | |

The lamps may be omitted from the heater-cathode circuits and voltages may be applied directly between the heaters and cathodes of all tubes to either disrupt short circuits across these elements or to burn out those tubes wherein it is not possible to disrupt the existing shorts. In a multi-grid tube, the screen grid would normally be energized from the anode supply. However, in another embodiment of the present invention, an additional bus strip is included in the apparatus for supplying the screen independently.

In the event that continuous strip 28, serving as return lead for all cathodes of all tubes, approaches its current-carrying capacity, it may be enlarged or split up into as many segments as necessary, each being returned to the power supply by an independent cable.

The application of jumper strips of the type shown at 29 to the various segments may be varied in many comminations to provide numerous and varied aging schedules. The further variations of schedule provided at the voltage control panel and by the setting of timer 22 permit even greater scheduling range. In the event that tube types of different pin connections are being run, changes in chassis connections from tube sockets to contactors are simply made, since the chassis are detachable from the main structure. As a final measure of adaptability, complete chassis may be exchanged when it is necessary or desirable.

This invention should not be limited to the details shown but only by the spirit and scope of the appended claims.

What is claimed is:

1. An aging conveyor for electron tubes comprising, a framework defining a generally elliptical closed path, a track mounted on said framework, a plurality of carrier members movable along said track, said carrier members being flexibly interlinked to form an endless chain, means for indexing said carrier members a predetermined distance about said path periodically, a plurality of detachable chassis, each having a number of tube sockets, one of said chassis being mounted on each of said carriers, a plurality of segmented bus strips arranged about the periphery of said framework, a plurality of power supplies, each being connected to a segment of said bus strips, a plurality of contactors mounted on each of said chassis, said contactors being resiliently urged against said bus strips, and means connecting each of said contactors to similar elements of tubes in said sockets.

2. An aging conveyor for electron tubes comprising: a generally elliptical framework, a track disposed in a horizontal plane about said framework, an endless articulated carrier mounted on said track, a plurality of chassis having sockets to receive said electron tubes mounted on said carrier, means for indexing said carrier about said track is a series of equally spaced steps, a plurality of adjustable power supplies, a plurality of segmented bus strips, each of said power supplies being connected to one of said bus strip segments, means for linking any combination of segments in any one of said bus strips, said indexing means being timed such that each movement roughly corresponds in length to a segment of said bus strips, a plurality of resilient contactors mounted on each of said chassis and urged against said bus strips, and means connecting terminals of said sockets to said contactors, whereby voltages of desired values may be applied to elements of said electron tubes for desired periods.

3. An aging conveyor for electron tubes comprising: a generally elliptical framework, a track supported by said framework, an endless articulated carrier movably mounted on said track, a plurality of bus strips arranged in parallel relationship about said framework, said bus strips less one being segmented into a number of sections, said one bus strip being continuous about said framework, a plurality of chassis having sockets for said electron tubes depending from said carrier, each of said chassis being mounted on a unit of said articulated carrier and having contacts for engaging each of said bus strips, means for indexing said carrier such that the contacts of a given chassis move from one of said sections to the next adjacent, jumpers for linking desired combinations of said sections into a single circuit, a plurality of power supplies for separately energizing said single circuits, and means for connecting said chassis contacts to terminals of said electron tube sockets, whereby the various elements of tubes inserted in said sockets may be energized with desired voltages for desired periods.

References Cited in the file of this patent

UNITED STATES PATENTS

| 1,753,914 | Bodge et al. | Apr. 8, 1930 |
| 1,955,794 | Du Mont et al. | Apr. 24, 1934 |
| 2,573,416 | Eddy | Oct. 30, 1951 |
| 2,595,182 | Weingarten | Apr. 29, 1952 |